(12) United States Patent
Ichikawa et al.

(10) Patent No.: US 9,575,236 B2
(45) Date of Patent: Feb. 21, 2017

(54) ILLUMINATION APPARATUS WITH CURVED LIGHT GUIDE

(71) Applicant: Toyoda Gosei Co., LTD., Kiyosu-shi (JP)

(72) Inventors: Tadaoki Ichikawa, Kiyosu (JP); Yoichi Matsuoka, Kiyosu (JP)

(73) Assignee: TOYODA GOSEI CO., LTD., Kiyosu-Shi, Aichi-Ken (JP)

( * ) Notice: Subject to any disclaimer, the term of this patent is extended or adjusted under 35 U.S.C. 154(b) by 107 days.

(21) Appl. No.: 14/520,140

(22) Filed: Oct. 21, 2014

(65) Prior Publication Data

US 2015/0109815 A1 Apr. 23, 2015

(30) Foreign Application Priority Data

Oct. 23, 2013 (JP) .................................. 2013-220437

(51) Int. Cl.
*F21V 8/00* (2006.01)
*B60Q 3/02* (2006.01)
*B60Q 3/00* (2006.01)

(52) U.S. Cl.
CPC ........... *G02B 6/0058* (2013.01); *B60Q 3/004* (2013.01); *B60Q 3/0216* (2013.01); *B60Q 3/0289* (2013.01); *G02B 6/005* (2013.01); *G02B 6/0073* (2013.01); *G02B 6/0088* (2013.01)

(58) Field of Classification Search
CPC ........ B60Q 3/002; B60Q 3/004; B60Q 3/005; B60Q 3/0209; B60Q 3/0216; B60Q 3/022; B60Q 3/0226; B60Q 3/023; B60Q 3/0279; B60Q 3/0283; B60Q 3/0286; B60Q 3/0289; F21V 2200/15; F21V 2200/20; G02B 6/0058; G02B 6/0088; G02B 6/0031; G02B 6/005; G02B 6/0073; G02B 6/0086
See application file for complete search history.

(56) References Cited

U.S. PATENT DOCUMENTS 7,210,829 B2   5/2007  Okazaki et al.
7,302,156 B1 * 11/2007  Lieberman ............. G02B 6/001
                                               345/173
(Continued)

FOREIGN PATENT DOCUMENTS

JP    2008-230608 A   10/2008
JP    2009-269492 A   11/2009
(Continued)

*Primary Examiner* — Anh Mai
*Assistant Examiner* — Steven Horikoshi
(74) *Attorney, Agent, or Firm* — McGinn IP Law Group, PLLC.

(57) ABSTRACT

An illumination apparatus includes a light source that emits light, a light guide member that has a base end surface onto which the light emitted from the light source is incident and a tip surface which is an opposite end surface to the base end surface, and guides the light from the base end surface towards the tip surface, and an attachment member that has a light shield property and an opening corresponding to a shape of the light guide member and accommodates the light guide member in the opening. The light guide member is curved so that a distance between the light guide member and the opening is gradually increased towards the tip surface-side in a longitudinal direction of the light guide member.

11 Claims, 5 Drawing Sheets

(56) References Cited

U.S. PATENT DOCUMENTS

| | | | | |
|---|---|---|---|---|
| 2004/0066659 A1* | 4/2004 | Mezei | ............ | G02B 6/001 362/555 |
| 2005/0219855 A1* | 10/2005 | Iwai | ............ | B60Q 1/26 362/490 |
| 2008/0055516 A1* | 3/2008 | Seo | ............ | G02B 6/0031 349/65 |
| 2010/0302804 A1* | 12/2010 | Inagaki | ............ | B60Q 3/004 362/606 |
| 2014/0226353 A1* | 8/2014 | Sohizad | ............ | G02B 6/001 362/511 |

FOREIGN PATENT DOCUMENTS

| | | |
|---|---|---|
| JP | 4737241 B2 | 7/2011 |
| JP | 5225744 82 | 7/2013 |

* cited by examiner

ILLUMINATION APPARATUS WITH CURVED LIGHT GUIDE

CROSS-REFERENCE TO RELATED APPLICATIONS

This application claims the benefit of Japanese Patent Application No. 2013-220437 (filed on Oct. 23, 2013), the entire contents of which are incorporated by reference herein.

BACKGROUND

1. Technical Field

The present invention relates to an illumination apparatus, and more particularly, to an illumination apparatus having a light guide member of a long article.

2. Related Art

Patent Document 1 discloses an illumination apparatus for a vehicle cabin where an illumination member of a long article having a light guide property is disposed on an instrument panel, an upper part of the instrument panel is formed with a recess portion, the recess portion opens downwardly, the illumination member is accommodated in the recess portion, a cover member is attached and fixed to the opening of the recess portion and light emitted from the illumination member is illuminated from the opening of the recess portion to an outside through the cover member.

Patent Document 2 discloses an illumination apparatus for a vehicle having a long light guide member and a light source configured to make light incident on an end surface of the light guide member in a longitudinal direction, where the light guide member is accommodated in a housing, the housing is attached to a molding and the light emitted from the light guide member is illuminated from an opening configured by the housing and the molding to an outside.

[Patent Document 1] Japanese Patent No. 4,737,241B
[Patent Document 2] Japanese Patent No. 5,225,744B In the technology of Patent Document 1, a distance (a distance between the illumination member and the cover member) between the illumination member and the opening of the recess portion is constant in a longitudinal direction of the illumination member.

Therefore, a shape of an illumination range (an illumination region) of the light emitted from the illumination member is similar to a shape (a long rectangular shape) of the opening of the recess portion and an illuminance in the illumination range is uniform, so that an illuminance difference (a contrast) between an internal and an external of the illumination range is increased.

For this reason, when an illumination target is very close to the illumination member, particularly, a boundary of the illumination range is clearly illuminated to the illumination target, so that an illumination effect of a soft texture by indirect illumination is deteriorated.

In the technology of Patent Document 2, a distance between the light guide member and the opening is constant in the longitudinal direction of the light guide member.

Therefore, a shape of an illumination range of the light emitted from the light guide member is similar to a shape (a long rectangular shape) of the opening and an illuminance in the illumination range is uniform, so that an illuminance difference between an internal and an external of the illumination range is increased.

For this reason, when an illumination target is very close to the light guide member, particularly, a boundary of the illumination range is clearly illuminated to the illumination target, so that an illumination effect of a soft texture by indirect illumination is deteriorated.

In recent years, for the indirect illumination of which illumination range has a long linear shape, it is required to improve the illumination effect of the indirect illumination by gradually decreasing the illuminance towards an end portion of the illumination range in a longitudinal direction and gradually narrowing a width of the illumination range in a width direction.

It is therefore an object of the present invention to provide an illumination apparatus capable of improving an illumination effect of indirect illumination.

SUMMARY

The inventors earnestly made a great deal of consideration so as to solve the above problem and deduced following aspects.

<First Aspect>

According to a first aspect of the invention, an illumination apparatus includes a light source that emits light, a light guide member that has a base end surface onto which the light emitted from the light source is incident and a tip surface which is an opposite end surface to the base end surface, and guides the light from the base end surface towards the tip surface, and an attachment member that has a light shield property and an opening corresponding to a shape of the light guide member and accommodates the light guide member in the opening. The light guide member is curved so that a distance between the light guide member and the opening is gradually increased towards the tip surface-side in a longitudinal direction of the light guide member.

In the first aspect, the distance between the light guide member and the opening is gradually increased towards the tip surface-side of the light guide member (the light guide member becomes more distant from the opening).

In general, since an illuminance is in inverse proportion to a square of a distance between a light guide member and an illumination target, an illuminance of the light emitted from the light guide member through the opening is also gradually decreased towards the tip surface-side. Therefore, a gradation of the brightness is generated in an illumination range of the emitted light, so that it is possible to reduce an illuminance difference (a contrast) between an interior and an exterior of the illumination range.

In addition, the light emitted from the light guide member through the opening in a width direction (a direction perpendicular to the longitudinal direction) of the light guide member towards the tip surface-side of the light guide member is shielded by the attachment member, so that a width of the illumination range thereof is gradually narrowed and is thus tapered. Therefore, a shape of the illumination range is a semi-elliptical shape of which major axis is the longitudinal direction of the light guide member.

Therefore, in the first aspect, regarding the indirect illumination of which illumination range has a long linear shape, the illuminance can be gradually decreased towards a tip portion (an end portion corresponding to the tip surface-side of the light guide member) of the illumination range in the longitudinal direction and a width of the illumination range in the width direction can be gradually narrowed, so that it is possible to improve the illumination effect of the indirect illumination.

According to the first aspect, even when the illumination target is very close to the light guide member, particularly, a boundary of the illumination range is not clearly illuminated to the illumination target, so that it is possible to prevent an illumination effect of a soft texture by the indirect illumination from being deteriorated.

<Second Aspect>

In the illumination apparatus according to the firsts aspect, the light guide member is curved so that the distance between the light guide member and the opening is gradually increased towards the base end surface-side in the longitudinal direction of the light guide member.

In the second aspect, the distance between the light guide member and the opening is gradually increased towards the base end surface-side of the light guide member (the light guide member becomes more distant from the opening).

In general, since the illuminance is in inverse proportion to the square of the distance between the light guide member and the illumination target, the illuminance of the light emitted from the light guide member through the opening is also gradually decreased towards the base end surface-side. Therefore, a gradation of the brightness is generated in the illumination range of the emitted light, so that it is possible to reduce the illuminance difference (the contrast) between the interior and the exterior of the illumination range.

In addition, the light emitted from the light guide member through the opening in the width direction of the light guide member towards the base end surface-side of the light guide member is shielded by the attachment member, so that the width of the illumination range thereof is gradually narrowed and is thus tapered. Therefore, a shape of the illumination range is a semi-elliptical shape of which major axis is the longitudinal direction of the light guide member.

Therefore, in the second aspect, in addition to the operations and effects of the first aspect, regarding the indirect illumination of which illumination range has a long linear shape, the illuminance can be gradually decreased towards both end portions (end portions corresponding to both the tip surface and the base end surface of the light guide member) of the illumination range in the longitudinal direction and the width of the illumination range in the width direction can be gradually narrowed, so that it is possible to improve the illumination effect of the indirect illumination.

<Third Aspect>

In the illumination apparatus according to the first or second aspect, the light guide member is convexly curved towards the opening and an optical axis of the curved part is inclined towards an outside of the light guide member in the longitudinal direction.

In the third aspect, it is possible to more securely accomplish the operations and effects of the first or second aspect.

<Fourth Aspect>

In the illumination apparatus according to one of the first to third aspects, the distance between the light guide member and the opening is constant at a central part of the light guide member in the longitudinal direction.

In the fourth aspect, since the illuminance of the light emitted from the central part of the light guide member in the longitudinal direction through the opening is increased, it is possible to brightly illuminate the illumination target facing the central part.

<Fifth Aspect>

The illumination apparatus according to one of the first to fourth aspects further includes a light shield member configured to cover both end portions of the light guide member and to thus shield the light emitted therefrom. In the fifth aspect, since it is difficult to control the light emitted from both end portions of the light guide member, it is possible to prevent the operations and effects of the first to fourth aspects from being degraded by shielding the emitted light with the light shield member.

<Sixth Aspect>

The illumination apparatus according to one of the first to fifth aspects further includes a lens configured to cover the opening.

In the sixth aspect, since it is possible to control the light emitted from the light guide member through the opening by the lens, it is possible to more securely accomplish the operations and effects of the first to fifth aspects.

Also, it is possible to protect the light guide member by the lens.

DETAILED DESCRIPTION

Hereinafter, respective illustrative embodiments of the present invention will be described with reference to the drawings. Meanwhile, in the respective illustrative embodiments, the same constitutional members and constitutional elements are denoted with the same reference numerals and the overlapping descriptions thereof are omitted.

Also, in the respective drawings, the sizes, shapes and arrangement places of the constitutional members of the respective illustrative embodiments are pictorially shown in hyperbole, and the sizes, shapes and arrangement places of the constitutional members are not necessarily matched with the actual things.

First Illustrative Embodiment

Figure 1A:
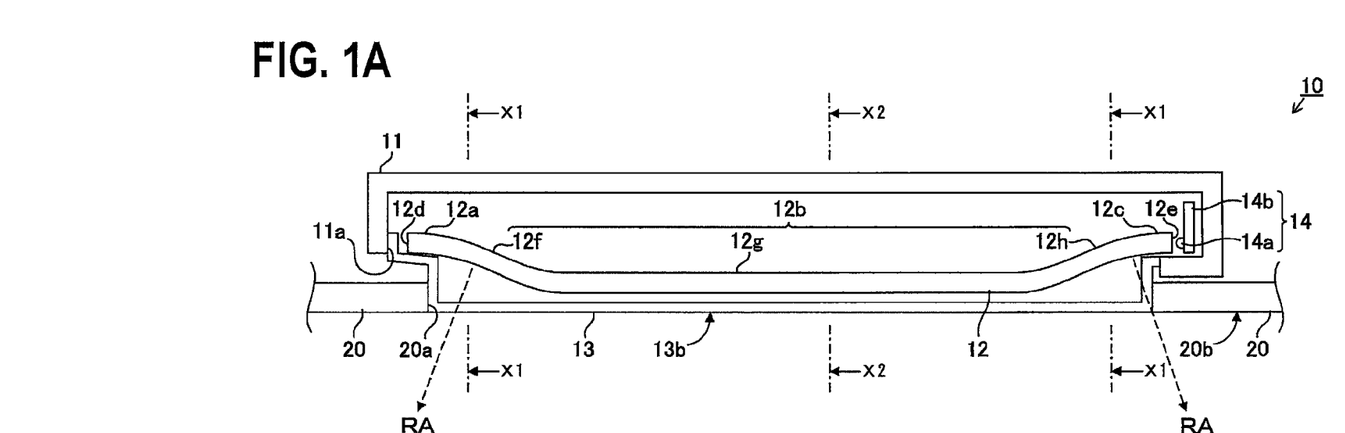
FIG. 1A is a longitudinal sectional view illustrating a schematic configuration of an illumination apparatus 10 according to a first illustrative embodiment of the present invention.
Figure 1B:
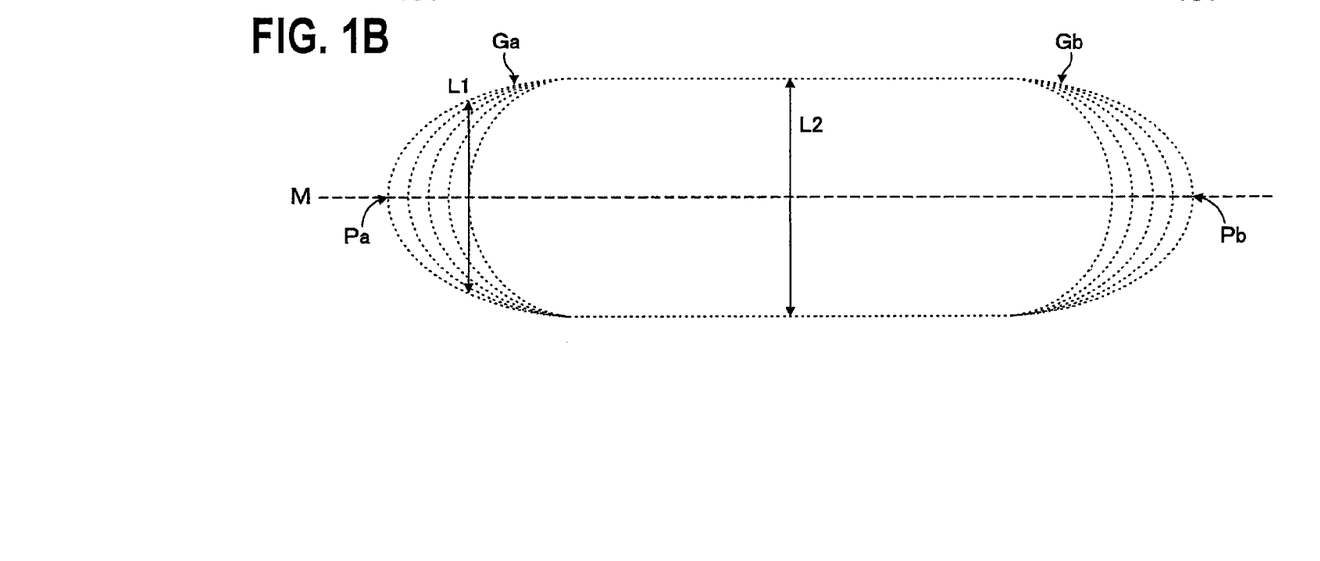
FIG. 1B is a plan view illustrating an illumination range of the illumination apparatus 10.
Figure 2A:
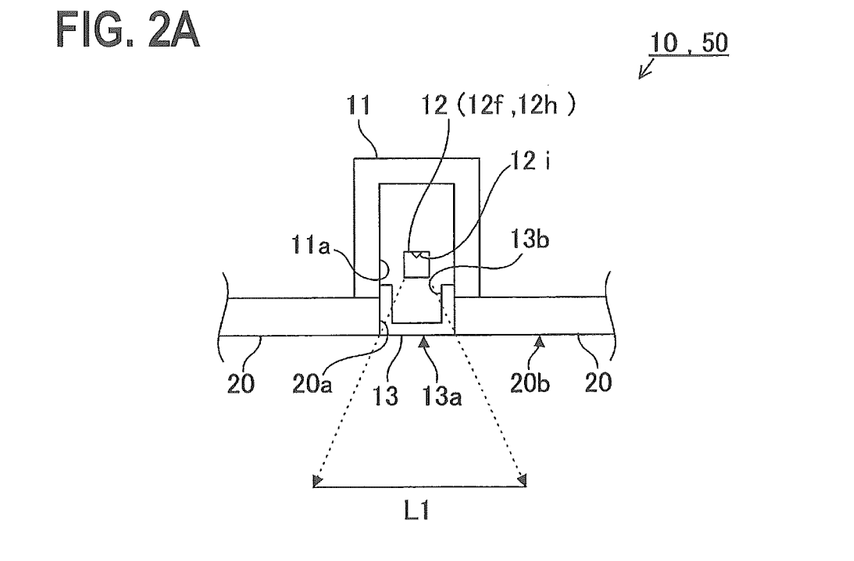
FIG. 2A is a longitudinal sectional view illustrating a schematic configuration of the illumination apparatus 10, 50 taken along an X1-X1 arrow direction of FIGS. 1A and 5A.
Figure 2B:
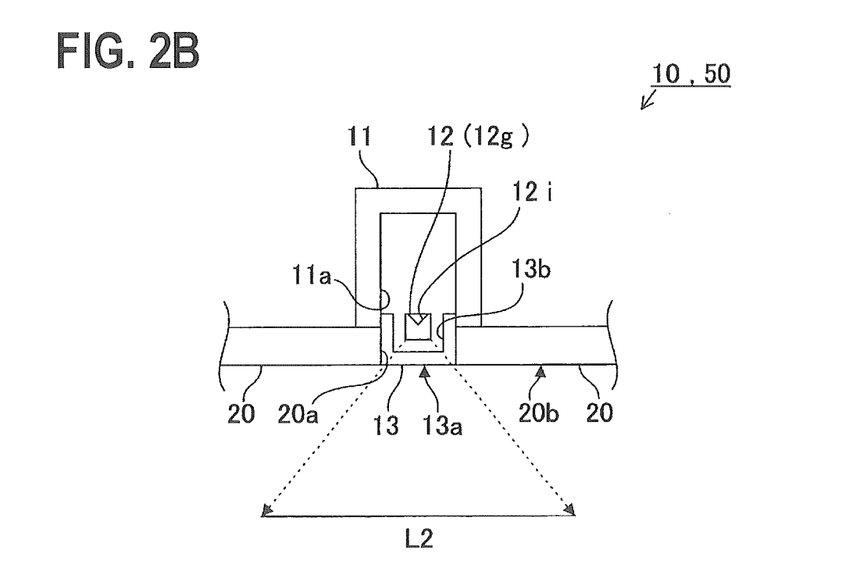
FIG. 2B is a longitudinal sectional view illustrating a schematic configuration of the illumination apparatus 10, 50 taken along an X2-X2 arrow direction of FIGS. 1A and 5A.

As shown in FIGS. 1 and 2, an illumination apparatus 10 of a first illustrative embodiment has a case 11 (an opening 11a), a light guide member 12 (a tip portion 12a, a central part 12b, a base end portion 12c, a tip surface 12d, a base end surface 12e, emission zones 12f to 12h, a recess 12i), a lens 13 (an opening 13a, a surface 13b), a light emission member 14 (an LED 14a, a wiring substrate 14b) and the like and is attached and fixed to a door trim 20 (an attachment hole 20a, a surface 20b) of a vehicle.

The case 11 is a long article of a substantially cuboidal box shape having the downward opening 11a and is integrally molded by an injection molding of a synthetic resin material having a light shield property. That is, the case 11 has elongated shape.

The light guide member 12 is a long article of an angled rod-shaped having a rectangular section, has the tip portion 12a, the central part 12b, the base end portion 12c, the tip surface 12d and the base end surface 12e, is integrally molded by an injection molding of a transparent synthetic resin material (for example, an acryl resin, a polycarbonate resin and the like) and is attached and fixed to an inside of the case 11. That is, the light guide member 12 is a elongated light guide member.

Regarding the light guide member 12, a sectional surface of the tip portion 12a is the tip surface 12d and a sectional surface of the base end portion 12c is the base end surface 12e.

The central part 12b of the light guide member 12 has the emission zones 12f to 12h. The emission zone 12f is arranged at the tip portion 12a-side and is connected to the tip portion 12a, the emission zone 12h is arranged at the base end portion 12c-side and is connected to the base end portion 12c, and the emission zone 12g is arranged between the emission zone 12f and the emission zone 12h.

The emission zone 12g has a substantially linear shape, and the emission zones 12f, 12h have a shape that is gently curved in the same direction (an opposite direction to the opening 11a of the case 11) relative to the emission zone 12g.

Regarding the light guide member 12, a surface facing the opening 11a of the case 11 is a light emission surface, and an opposite surface facing the light emission surface is a reflection surface.

The reflection surface of the light guide member 12 is formed with the recess 12i having a triangular section along a longitudinal direction of the light guide member 12.

The sectional shape of the recess 12i of the light guide member 12 is formed to have the same size and shape in the emission zone 12g of the central part 12b of the light guide member 12.

Also, the sectional shape of the recess 12i of the light guide member 12 is formed so that a width and a depth thereof are gradually decreased towards the tip portion 12a or base end portion 12c in the emission zones 12f, 12h of the central part 12b of the light guide member 12.

The lens (outer lens) 13 is a long article of a substantially cuboidal box shape having the upward opening 13a, is integrally molded by an injection molding of a transparent or semi-transparent synthetic resin material (for example, an acryl resin, a polycarbonate resin and the like) and is fitted and fixed to the opening 11a of the case 11 so that the surface 13b of the lens faces downwardly.

The light emission member 14 is provided with the LED (Light Emitting Diode) 14a and the wiring substrate 14b on which the LED 14a is mounted, is attached and fixed to the inside of the case 11, and is fed with direct current power from a vehicle-mounted battery (not shown) through a vehicle wire harness (not shown).

The LED 14a is arranged to face the base end surface 12e of the light guide member 12 at a slight interval.

For this reason, after the light emitted from the LED 14a is incident onto the base end surface 12e of the light guide member 12, the light is reflected on a surface of the recess 12i of the light guide member 12 and is emitted towards the outside from surfaces (light emission surfaces) of the end portions 12a, 12c and central part 12b in a substantially perpendicular direction to an axial direction of the light guide member 12 while the light is guided towards the tip surface 12d-side (an axial direction tip-side) along the inside of the light guide member 12.

The door trim 20 has the penetrated attachment hole 20a having a long rectangular shape and is integrally molded by an injection molding of a synthetic resin material having a light shield property.

The illumination apparatus 10 is attached and fixed to the door trim 20 from a backside of the door trim, the lens 13 of the illumination apparatus 10 is fitted into the attachment hole 20a of the door trim 20 without a gap, the surface 13b of the lens 13 is exposed through the attachment hole 20a, and the surface 20b of the door trim 20 is flush with the surface 13b of the lens 13.

In the meantime, since a planar shape of the surface 13b of the lens 13 corresponds to a shape of the light guide member 12, a planar shape of the attachment hole 20a of the door trim 20 also corresponds to the shape of the light guide member 12.

In the illumination apparatus 10, a slight gap is provided between the light guide member 12 and the surface 13b of the lens 13 in a longitudinal direction of the emission zone 12g of the central part 12b of the light guide member 12, so that a distance (a distance between the light guide member 12 and the surface 13b of the lens 13) between the light guide member 12 and the attachment hole 20a of the door trim 20 is constant.

Also, the tip portion 12a and the base end portion 12c of the light guide member 12 are covered by the door trim 20.

The emission zone 12f is curved and the light guide member 12 and the lens 13 and the attachment hole 20a of the door trim 20 are arranged so that a distance between the light guide member 12 and the attachment hole 20a of the door trim 20 is gradually increased (the light guide member 12 becomes more distant from the attachment hole 20a of the door trim 20) towards the tip surface 12d-side of the light guide member 12 in the longitudinal direction of the emission zone 12f of the central part 12b of the light guide member 12.

Also, the emission zone 12h is curved and the light guide member 12, the lens 13 and the attachment hole 20a of the door trim 20 are arranged so that the distance between the light guide member 12 and the attachment hole 20a of the door trim 20 is gradually increased towards the base end surface 12e-side of the light guide member 12 in the longitudinal direction of the emission zone 12h of the central part 12b of the light guide member 12.

Operations and Effects of First Illustrative Embodiment

According to the illumination apparatus 10 of the first illustrative embodiment, following operations and effects can be accomplished.

Figure 3A:
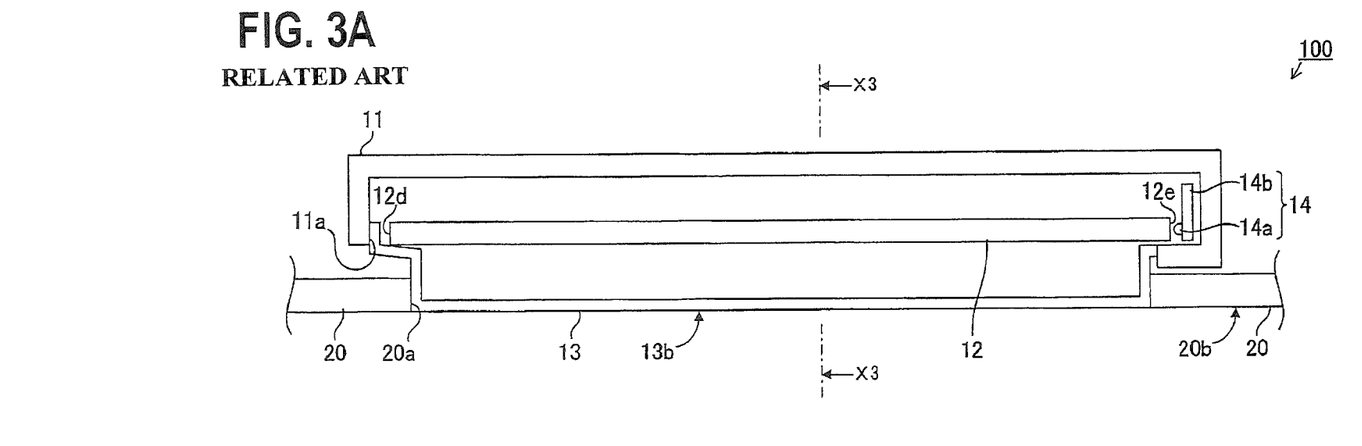
FIG. 3A is a longitudinal sectional view illustrating a schematic configuration of an illumination apparatus 100 of the related art.
Figure 3B:
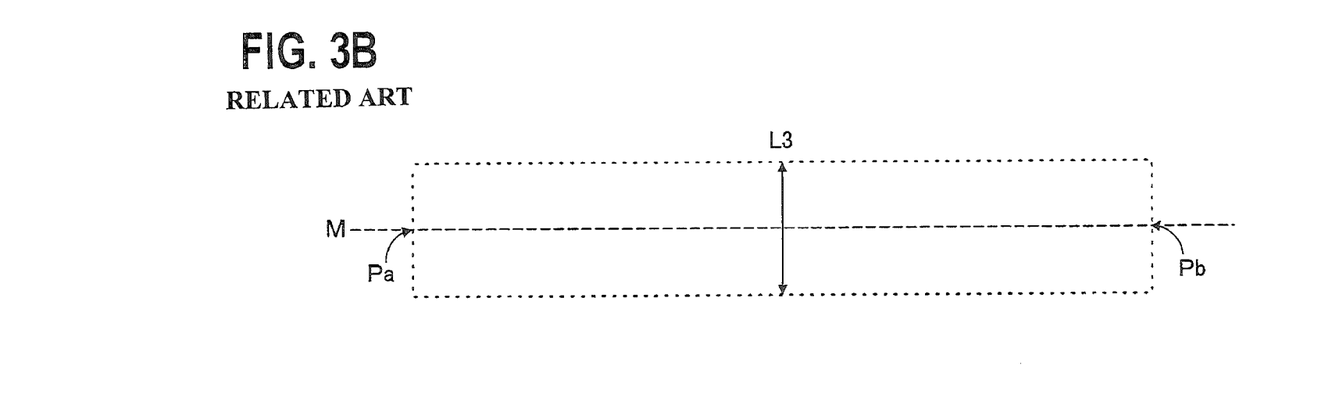
FIG. 3B is a plan view illustrating an illumination range of the illumination apparatus 100.
Figure 4:
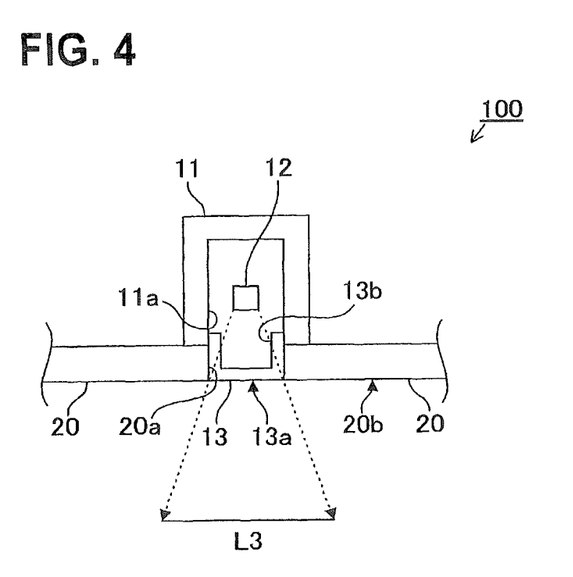
FIG. 4 is a longitudinal sectional view illustrating a schematic configuration of the illumination apparatus 100 taken along an X3-X3 arrow direction of FIG. 3A.

[1-1] As shown in FIGS. 3 and 4, according to the illumination apparatus 100 of the related art, the distance between the light guide member 12 and the attachment hole 20a of the door trim 20 is constant in the longitudinal direction of the light guide member 12.

As a result, the light emitted from the light guide member 12 through the attachment hole 20a of the door trim 20 in the width direction (the direction perpendicular to the longitudinal direction) of the light guide member 12 has a constant width L3 of an illumination range (an illumination region). Therefore, a shape of the illumination range is a long rectangular shape similar to a shape of the attachment hole 20a (refer to FIG. 3B) and an illuminance in the illumination range is uniform, so that an illuminance difference (a contrast) between an internal and an external of the illumination range is increased.

For this reason, when an illumination target is very close to the light guide member 12, particularly, a boundary of the illumination range is clearly illuminated to the illumination target. Therefore, since the illumination range continuously illuminated in the longitudinal direction of the light guide member 12 seems to be abruptly interrupted by the boundary, an illumination effect of a soft texture by indirect illumination is deteriorated.

[1-2] According to the illumination apparatus 10 of the first illustrative embodiment, the distance between the light guide member 12 and the attachment hole 20a (the opening) of the door trim 20 (the attachment member) is gradually increased (the light guide member 12 more becomes distant from the attachment hole 20a of the door trim 20) towards the tip surface 12d-side of the light guide member 12 in the longitudinal direction of the light guide member 12.

In general, since an illuminance is in inverse proportion to a square of a distance between the light guide member 12 and the illumination target, an illuminance of the light emitted from the light guide member 12 through the attachment hole 20a of the door trim 20 is also gradually decreased towards the tip surface 12d-side. Therefore, a gradation Ga of the brightness is generated in the illumination range of the emitted light (refer to FIG. 1B), so that it is possible to reduce an illuminance difference between an interior and an exterior of the illumination range.

In addition, the light emitted from the light guide member 12 through the attachment hole 20a of the door trim 20 in the width direction of the light guide member 12 towards the tip surface 12d-side of the light guide member 12 is shielded by the case 11 and the door trim 20, so that widths L1, L2 of the illumination range thereof are gradually narrowed and are thus tapered. Therefore, a shape of the illumination range is a semi-elliptical shape of which major axis M is the longitudinal direction of the light guide member 12 (refer to FIGS. 1B and 2).

Therefore, according to the illumination apparatus 10, regarding the indirect illumination of which illumination range has a long linear shape, the illuminance can be gradually decreased towards a tip portion Pa (an end portion corresponding to the tip surface 12d-side of the light guide member 12) of the illumination range in the longitudinal direction and the width of the illumination range in the width direction can be gradually narrowed (FIGS. 1B and 2), so that it is possible to improve the illumination effect of the indirect illumination.

For this reason, even when the illumination target is very close to the light guide member 12, particularly, a boundary of the illumination range is not clearly illuminated to the illumination target, so that it is possible to prevent an illumination effect of a soft texture by the indirect illumination from being deteriorated.

[1-3] According to the illumination apparatus 10, the distance between the light guide member 12 and the attachment hole 20a of the door trim 20 is gradually increased towards the base end surface 12e-side of the light guide member 12.

In general, since the illuminance is in inverse proportion to the square of the distance between the light guide member 12 and the illumination target, the illuminance of the light emitted from the light guide member 12 through the attachment hole 20a of the door trim 20 is also gradually decreased towards the base end surface 12e-side. Therefore, a gradation Gb of the brightness is generated in the illumination range of the emitted light (refer to FIG. 1B), so that it is possible to reduce the illuminance difference between the interior and the exterior of the illumination range.

In addition, the light emitted from the light guide member 12 through the attachment hole 20a of the door trim 20 in the width direction of the light guide member 12 towards the base end surface 12e-side of the light guide member 12 is shielded by the case 11 and the door trim 20, so that the widths L1, L2 of the illumination range thereof are gradually narrowed and are thus tapered. Therefore, a shape of the illumination range is a semi-elliptical shape of which major axis M is the longitudinal direction of the light guide member 12 (refer to FIGS. 1B and 2).

Therefore, according to the illumination apparatus 10, regarding the indirect illumination of which illumination range has a long linear shape, the illuminance can be gradually decreased towards a base end portion Pb (an end portion corresponding to the base end surface 12e-side of the light guide member 12) of the illumination range in the longitudinal direction and the width of the illumination range in the width direction can be gradually narrowed (FIGS. 1B and 2), so that it is possible to improve the illumination effect of the indirect illumination.

[1-4] Since the light guide member 12 is convexly curved towards the attachment hole 20a (the opening) of the door trim 20 (the attachment member) and an optical axis RA (a line perpendicular to the light emission surface of the light guide member 12) of the curved part is inclined towards an outside of the light guide member 12 in the longitudinal direction (refer to FIG. 1A), it is possible to more securely accomplish the operations and effects described in the above [1-2] and [1-3] sections.

In other words, if the light guide member 12 is concavely curved towards the attachment hole 20a of the door trim 20 or the light guide member 12 is stepwise bent, it is difficult to accomplish the operations and effects described in the above [1-2] and [1-3] sections.

[1-5] In the emission zone 12g (the central part of the light guide member in the longitudinal direction) of the central part 12b of the light guide member 12, the distance between light guide member 12 and the attachment hole 20a of the door trim 20 is constant.

For this reason, since the illuminance of the light emitted from the emission zone 12g of the central part 12b of the light guide member 12 through the attachment hole 20a of the door trim 20 is also increased, it is possible to brightly illuminate the illumination target facing the emission zone 12g.

[1-6] The tip portion 12a and the base end portion 12c of the light guide member 12 are covered by the door trim 20 (the light shield member) having a light shield property.

Since it is difficult to control the light emitted from both end portions (the tip portion 12a and the base end portion 12c) of the light guide member 12, it is possible to prevent the operations and effects described in the above [1-2] to [1-5] sections from being degraded by shielding the emitted light with the light shield member.

[1-7] The lens 13 is fitted in the attachment hole 20a of the door trim 20 without a gap, so that the attachment hole 20a is covered by the lens 13.

For this reason, since it is possible to control the light emitted from the light guide member 12 through the attachment hole 20a of the door trim 20 by the lens 13, it is possible to more securely accomplish the operations and effects described in the above [1-2] to [1-6] sections.

Also, it is possible to protect the light guide member 12 by the lens 13.

[1-8] The sectional shape of the recess 12i of the light guide member 12 is formed so that the width and the depth thereof are gradually decreased towards the tip portion 12a or base end portion 12c in the emission zones 12f, 12h of the central part 12b of the light guide member 12.

For this reason, it is possible to gradually reduce an amount of the light reflected on the recess 12i towards the tip portion 12a or base end portion 12c of the light guide member 12, so that it is possible to further improve the operations and effects described in the above [1-2] to [1-4] sections.

Second Illustrative Embodiment

Figure 5A:
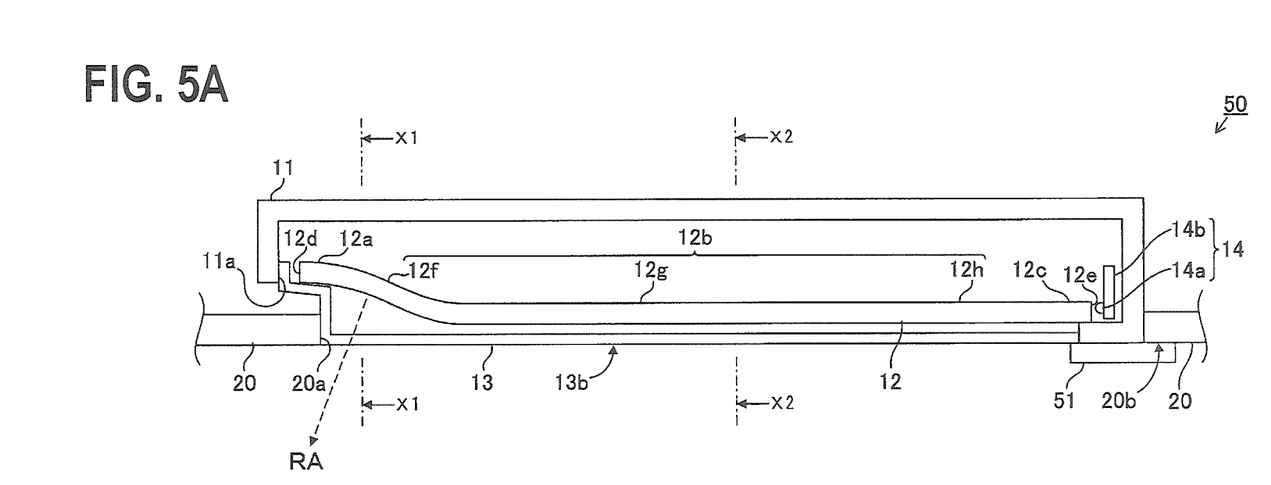
FIG. 5A is a longitudinal sectional view illustrating a schematic configuration of an illumination apparatus 50 according to a second illustrative embodiment of the present invention.
Figure 5B:
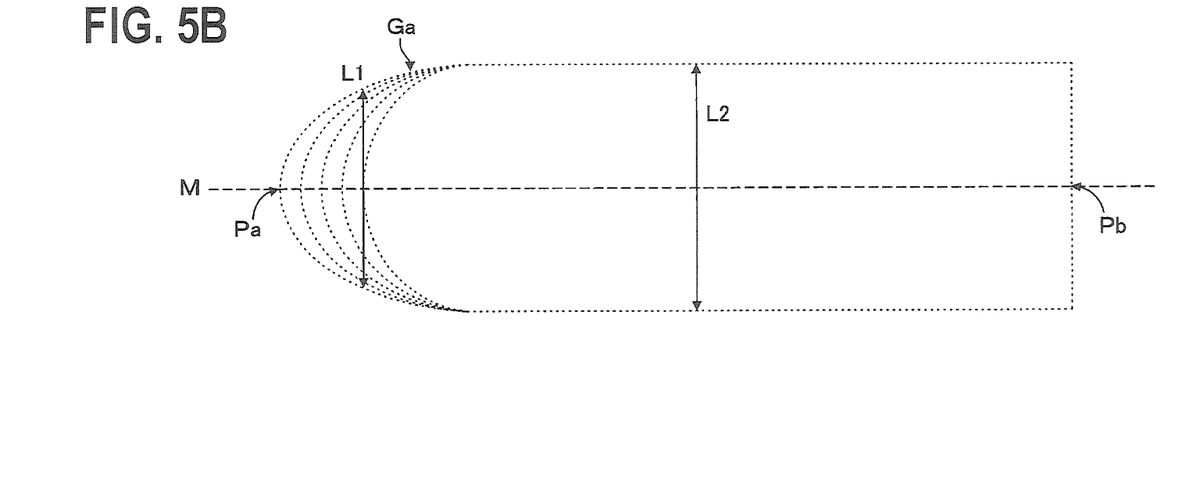
FIG. 5B is a plan view illustrating an illumination range of the illumination apparatus 50.

As shown in FIGS. 2 and 5, an illumination apparatus 50 of a second illustrative embodiment has the case 11 (the opening 11a), the light guide member 12 (the tip portion 12a, the central part 12b, the base end portion 12c, the tip surface 12d, the base end surface 12e, the emission zones 12f to 12h, 12i), the lens 13 (the opening 13a, the surface 13b), the light emission member 14 (the LED 14a, the wiring substrate 14b), a light shield member 51 and the like and is attached and fixed to the door trim 20 (the attachment hole 20a, the surface 20b) of a vehicle.

The illumination apparatus 50 of the second illustrative embodiment is different from the illumination apparatus 10 of the first illustrative embodiment, in that:

[i] At the central part 12b of the light guide member 12, not only the outer column 12g but also the emission zone 12h has a substantially linear shape, and only the emission zone 12f is gently curved in one direction (an opposite direction to the opening 11a of the case 11) relative to the emission zones 12g, 12h.

[ii] In the longitudinal direction of the emission zones 12g, 12h of the central part 12b of the light guide member 12, a slight void is provided between the light guide member 12 and the surface 13b of the lens 13, so that a distance between the light guide member 12 and the surface 13b of the lens 13 is constant.

[iii] The light shield member 51 is attached and fixed to the case 11 and the lens 13 so that it covers the base end portion 12c of the light guide member 12.

Therefore, according to the illumination apparatus 50 of the second illustrative embodiment, it is possible to accomplish following operations and effects, in addition to the same operations and effects as those described in the above [1-2], [1-4], [1-7] and [1-8] sections of the first illustrative embodiment.

[2-1] In the emission zones 12g, 12g of the central part 12b of the light guide member 12, the distance between the light guide member 12 and the attachment hole 20a of the door trim 20 is constant.

For this reason, since the illuminance of the light emitted from the emission zones 12g, 12h of the central part 12b of the light guide member 12 through the attachment hole 20a of the door trim 20 is increased, it is possible to brightly illuminate the illumination target facing the emission zones 12g, 12h.

[2-2] The tip portion 12a of the light guide member 12 is covered by the door trim 20 having a light shield property. Also, the base end portion 12c of the light guide member 12 is covered by the light shield member 51.

Since it is difficult to control the light emitted from both end portions (the tip portion 12a and the base end portion 12c) of the light guide member 12, it is possible to prevent the operations and effects described in the above [1-2] and [2-1] sections from being degraded by shielding the emitted light with the door trim 20 and the light shield member 51.

In the meantime, the light shield member 51 may be commoditized with a decorative member such as a garnish attached to the door trim 20.

Other Illustrative Embodiments

The present invention is not limited to the above illustrative embodiments and may be embodied as follows. Also in this case, it is possible to accomplish the equivalent or higher operations and effects to or than the respective illustrative embodiments.

[A] The case 11 may be omitted and the light guide member 12 may be directly attached and fixed to the inside of the door trim 20.

[B] The lens 13 may be omitted and the light guide member 12 may be exposed from the attachment hole 20a of the door trim 20 and the opening 11a of the case 11.

[C] Like the light shield member 51 of the second illustrative embodiment, the tip portion 12a of the light guide member 12 may be covered by a light shield member or case 11 separately provided from the door trim 20.

[D] In the above illustrative embodiments, the emission zone 12g of the central part 12b of the light guide member 12 is linear. However, the emission zone 12g may be curved. In this case, the lens 13 and the attachment hole 20a of the door trim 20 may be curved in conformity to the curved shape of the emission zone 12g.

[E] The LED 14a may be replaced with any light source (for example, a semiconductor light emitting element such as EL (Electro Luminescence), a bulb and the like).

[F] In the above illustrative embodiments, the light guide member 12 that is a long article of an angled rod-shaped having a rectangular section is used. However, the sectional shape of the light guide member 12 may be arbitrary (for example, a circular section, a triangular section, a polygonal section such as a pentagonal or higher section, and the like).

[G] In the above illustrative embodiments, the light guide member 12 having the recess 12i formed along the longitudinal direction is used. However, the recess 12i may be omitted. That is, instead of the recess 12i, fine particles of a material having a high light scattering property (for example, silica, titanium oxide and the like) may be contained in the light guide member 12 and the light may be scattered by the fine particles, thereby emitting the light from the light emission surface of the light guide member 12 to the outside.

[H] The illumination apparatuses 10, 50 of the respective illustrative embodiments are mounted to the door trim 20. However, the illumination apparatus of the present invention may be mounted to any place in the vehicle cabin (for example, a center console, an instrument panel, a roof-side trim, a trim in a trunk room, a pillar trim, a luggage side trim and the like), may be directly mounted to a vehicle body panel such as a door panel, and may be appropriately changed as regards the specific detailed structure and the like, depending on the mounting places.

[I] The illumination apparatuses 10, 50 of the respective illustrative embodiments are applied for the interior illumination of the vehicle. However, the present invention is not limited to the vehicle and may be applied for illumination of any article (for example, an electric article, furniture and the like). In this case, the door trim 20 serving as the attachment member may be replaced with an outer covering member of the corresponding article.

The present invention is not limited to the above aspects and illustrative embodiments. A variety of modifications that can be easily deduced by one skilled in the art without departing from the scope of the claims are also included in the present invention. The disclosures of the Patent Publications and the like described in the specification are incorporated herein by quotation thereof.

What is claimed is:

1. An illumination apparatus comprising:
   a light source that emits light;
   a light guide member that has a base end surface onto which the light emitted from the light source is incident and a tip surface which is an opposite end surface to the base end surface, and guides the light from the base end surface towards the tip surface; and
   an attachment member that has a light shield property and an opening corresponding to a shape of the light guide member and accommodates the light guide member in the opening,
   wherein the light guide member is curved so that a distance between the light guide member and the opening is gradually increased towards the tip surface-side in a longitudinal direction of the light guide member, and
   wherein the light guide member is curved such that the light emitted from the light guide member through the opening in a width direction of the light guide member towards the tip surface-side of the light guide member is shielded by the attachment member such that widths of the illumination range of the light guide member are narrowed and tapered.

2. The illumination apparatus according to claim 1, wherein the light guide member is curved so that the distance between the light guide member and the opening is gradually increased towards the base end surface-side in the longitudinal direction of the light guide member.

3. The illumination apparatus according to claim 1, wherein the light guide member is convexly curved towards the opening and an optical axis of the curved part is inclined towards an outside of the light guide member in the longitudinal direction.

4. The illumination apparatus according to claim 1, wherein the distance between the light guide member and the opening is constant at a central part of the light guide member in the longitudinal direction.

5. The illumination apparatus according to claim 1, further comprising a light shield member configured to cover both end portions of the light guide member and to thus shield the light emitted therefrom.

6. The illumination apparatus according to claim 1, further comprising a lens configured to cover the opening.

7. The illumination apparatus according to claim 1, wherein the light guide member includes:
   a tip portion disposed at the tip surface-side in the longitudinal direction of the light guide member;
   a first emission zone portion having an inclined surface; and
   a second emission zone portion, a surface of the second emission zone portion,
   wherein the first emission zone is disposed between the tip portion and the second emission zone portion.

8. The illumination apparatus according to claim 1, wherein the light guide member includes a recess along a longitudinal direction of the light guide member.

9. The illumination apparatus according to claim 1, wherein the light guide member includes a recess formed along an entire length of the light guide member.

10. The illumination apparatus according to claim 1, wherein the light guide member includes a recess having a width and a depth thereof gradually decreased towards the tip surface-side in a longitudinal direction of the light guide member.

11. The illumination apparatus according to claim 1, wherein the light guide member includes a reflection surface facing away from the opening, and
   wherein the reflection surface includes a recess having a triangular section formed along the longitudinal direction of the reflection surface.

* * * * *